United States Patent [19]
Mikeska

[11] Patent Number: 5,938,290
[45] Date of Patent: Aug. 17, 1999

[54] GRASS TRIMMER FOR A SPRINKLER HEAD

[76] Inventor: Delano Mikeska, 103 Lakeview Ct., Brownwood, Tex. 76801-6805

[21] Appl. No.: 08/797,868

[22] Filed: Feb. 10, 1997

[51] Int. Cl.⁶ .................................................. B26B 27/00
[52] U.S. Cl. ............................ 300/30; 30/DIG. 7; 172/25
[58] Field of Search .............................. 30/300, 310, 347, 30/276, DIG. 7; 172/13, 25

[56] References Cited

U.S. PATENT DOCUMENTS

| | | |
|---|---|---|
| 1,480,151 | 1/1924 | Cosman . |
| 2,573,462 | 10/1951 | Lindsay ................................. 30/300 X |
| 2,615,246 | 10/1952 | Littig . |
| 2,691,823 | 10/1954 | Dombrowski . |
| 3,565,179 | 2/1971 | Paliani ................................. 30/300 X |
| 3,747,213 | 7/1973 | Green et al. . |
| 3,938,249 | 2/1976 | Chacon . |
| 4,209,903 | 7/1980 | Owens . |
| 5,461,788 | 10/1995 | Taylor ....................................... 30/300 |

*Primary Examiner*—Douglas D. Watts
*Attorney, Agent, or Firm*—Michael I. Kroll

[57] ABSTRACT

A grass trimmer (10) for a sprinkler head (12) on a water supply pipe (14) in a lawn (16) comprising a handle (18) with a handgrip (20) transversely attached to a top end of the handle (18). A tubular cutting assembly (22) is also provided. A structure (24) is for connecting a bottom end (26) of the handle (18) to an upper end (28) of the tubular cutting assembly (22). When the tubular cutting assembly (22) is placed over the sprinkler head (12) and the handgrip (20) is turned back and forth, the tubular cutting assembly (22) will remove grass (30) from about the sprinkler head (12) in the lawn (16).

18 Claims, 4 Drawing Sheets

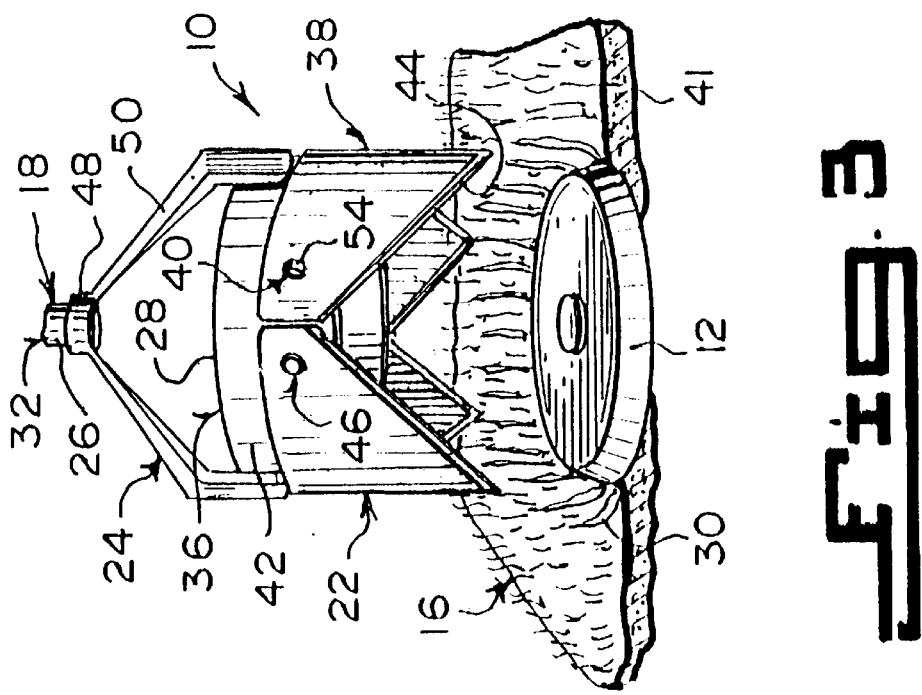
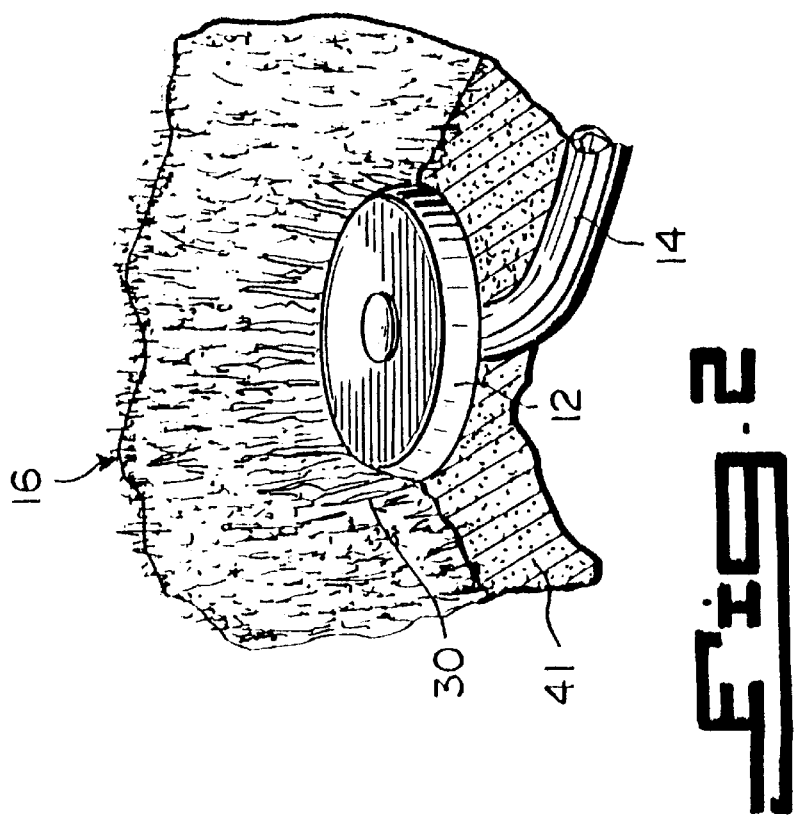

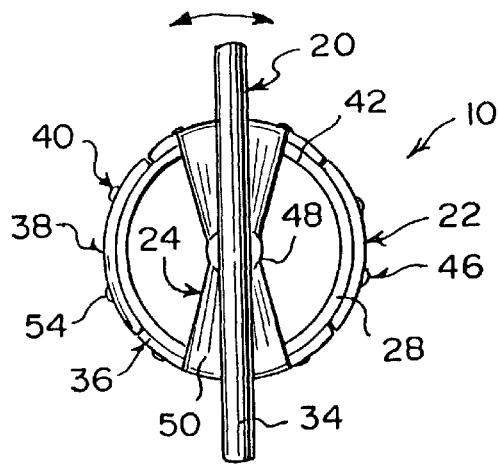
Fig. 5
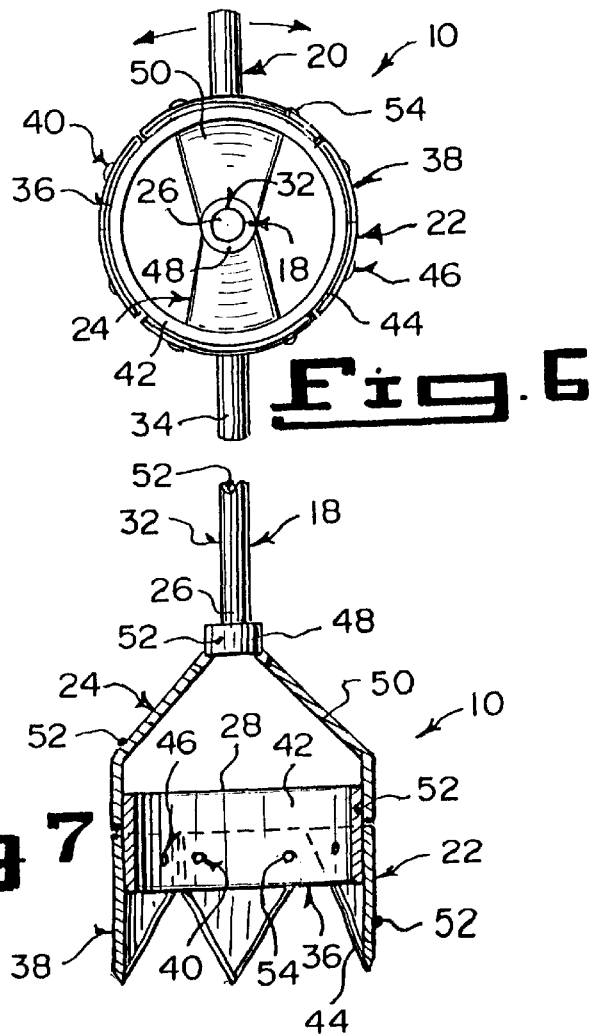
Fig. 6
Fig. 7

GRASS TRIMMER FOR A SPRINKLER HEAD

BACKGROUND OF THE INVENTION

1. Field of the Invention

The instant invention relates generally to lawn cutting tools and more specifically it relates to a grass trimmer for a sprinkler head. The grass trimmer for a sprinkler head is a simple tool for cutting and trimming grass around each sprinkler head built into a lawn.

2. Description of the Prior Art

Numerous lawn cutting tools have been provided in prior art. For example, U.S. Pat. Nos. 1,480,151 to Cosman; 2,615,246 to Littig; 2,691,823 to Dombrowski; 3,747,213 to Green et al.; 3,938,249 to Chacon and 4,209,903 to Owens all are illustrative of such prior art. While these units may be suitable for the particular purpose to which they address, they would not be as suitable for the purposes of the present invention as heretofore described.

COSMAN, NATHAN G.

GRASS CUTTER

U.S. Pat. No. 1,480,151

In a device of the type described, concentric cylinders have their lower ends arranged in approximately the same plane. A handle connects the upper ends of the cylinders and maintains the same in concentric relation. Radially directed blades connect the lower ends of the cylinders.

LITTIG, ARTHUR

LAWN TRIMMER

U.S. Pat. No. 2,615,246

A device for trimming sod from around a sprinkler, comprising a frusto-conical body having an axial passage therethrough and positioned when in use with its smaller end down to rest on the sod. A handle member is attached to the larger end of the body to extend upwardly therefrom. A pair of elongate blades are provided with each having a longitudinal cutting edge. A means secures an end of each blade to the inclined cuter face of the body to extend tangentially of the body face. The blades are joined to the body at opposite sides of the latter and have their free ends extending in opposite directions.

DOMBROWSKI, EDWARD

GRASS CUTTING DEVICE

U.S. Pat. No. 2,691,823

In a device for cutting grass and sod around a sprinkler head, a body member has a sprinkler head embracing portion arranged to penetrate the ground and to be rotated with the member about the head. A cutter for cutting around the head is provided. A means connects the cutter for rotation with the body member around the head in a path which is spaced outwardly from the body member. The connecting means includes an L-shaped arm connected at one end with the cutter. The arm has a series of openings therein adjacent the other end thereof. An element on the body member is selectively insertable through the openings for setting the cutter in different offset positions relative to the ground penetrating portion of the body member. A projection on the body member to one side of element is engageable in an opening in the arm to restrain rotative movement of the arm about the element.

GREEN, IRVING C.

ROSALES, JOSEPH G.

ELMORE, JOHN O.

SPRINKLER ANGULAR GRASS CUTTERS

U.S. Pat. No. 3,747,213

A device for trimming grass adjacent a sprinkler head compresses an elongated upright shaft. A rotor is carried at the lower end of the shaft and has an upright axis about which the rotor is rotatable. A guide at the underside of the rotor embraces the sprinkler head. The rotor carries a series of downwardly presented cutters circularly spaced about the axis. The cutters taper downwardly and inwardly toward a lower extension of the axis. Clippings trimmed by the cutters in response to rotor rotation are thrown upwardly through the spaces for outward discharge.

CHACON, RENE ARAGON

SPRINKLER HEAD CLEANING DEVICE

U.S. Pat. No. 3,938,249

A powered device is disclosed herein for removing soil, weeds or the like from the immediate area beneath a sprinkler head. A central shaft having a forward end is engageable with the sprinkler head as a guide. A U-shaped member is fixed on the shaft, so as to rotate therewith. Each leg of the U-shaped member extends downwardly to clear the peripheral edge of the circular sprinkler head. A cutting blade is angularly secured to each end or leg of the U-shaped member. A forward portion thereof extends underneath the sprinkler head and a rearward portion extends outwardly in a diverging relationship to the sprinkler head. Power drive is releasably coupled to the shaft for rotation of the cutting blades about the sprinkler head.

OWENS, WARNER R.

SPRINKLER HEAD TRIMMING DEVICE

U.S. Pat. No. 4,209,903

A cutting device for trimming grass and removing soil and debris from around a sprinkler head. The device includes a shaft with a handle mounted at one end to permit the user to push down and turn the device at the same time. A tubular cutting member is mounted at the other end in combination with a foot stand for enabling the user to initially push the cutting member into the ground by standing thereon. A pair of projecting blades extend from the inner surface of the tubular member and are limited in length to permit passage of the sprinkler head therebetween. These blades are also slightly pitched to develop a digging action upon rotation of the device in the ground around the sprinkler head and attached pipe. After the device is inserted into the ground and appropriately rotated, it is withdrawn with the enclosed grass, soil and debris.

SUMMARY OF THE INVENTION

A primary object of the present invention is to provide a grass trimmer for a sprinkler head that will overcome the shortcomings of the prior art devices.

Another object is to provide a grass trimmer for a sprinkler head that will make a clean, neat and uniform cut of grass surrounding each sprinkler head built into a lawn.

An additional object is to provide a grass trimmer for a sprinkler head that can be manipulated without the use of an electric motor with cord or without the operation thereof by a gas engine.

A further object is to provide a grass trimmer for a sprinkler head that is simple and easy to use.

A still further object is to provide a grass trimmer for a sprinkler head that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views, and wherein;

FIG. 2 is an enlarged perspective view as indicated by arrow 2 in FIG. 1, with parts broken away showing one typical sprinkler head in greater detail.

FIG. 3 is a perspective view similar to FIG. 2, with a lower portion of the instant invention ready to be inserted over the sprinkler head.

FIG. 5 is a top view taken in the direction of arrow 5 in FIG. 4.

FIG. 6 is a bottom view taken in the direction of arrow 6 in FIG. 4.

FIG. 7 is a cross sectional view taken along line 7—7 in FIG. 4.

Similar reference characters denote corresponding features consistently throughout the attached drawings.

DETAILED DESCRIPTION OF THE PREFERRED EMBODIMENTS

Figure 1:
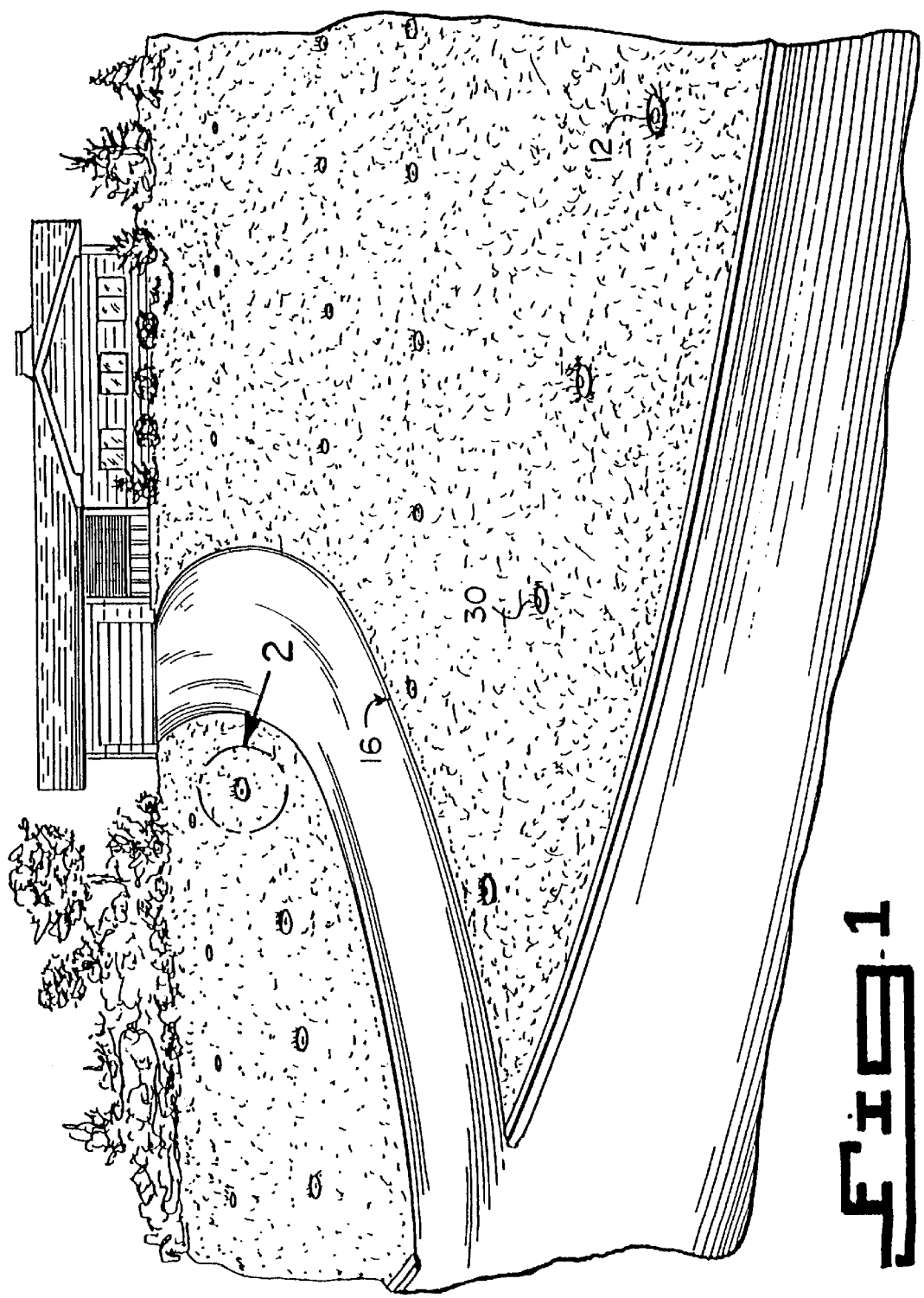
FIG. 1 is a perspective view of a lawn with a built-in sprinkler system.

Turning now descriptively to the drawings, in which similar reference characters denote similar elements throughout the several views, FIGS. 3 to 7 illustrate a grass trimmer 10 for a sprinkler head 12 on a water supply pipe 14 in a lawn 16 (see FIGS. 1 and 2), comprising a handle 18 with a handgrip 20 transversely attached to a top end of the handle 18. A tubular cutting assembly 22 is also provided. A structure 24 is for connecting a bottom end 26 of the handle 18 to an upper end 28 of the tubular cutting assembly 22. When the tubular cutting assembly 22 is placed over the sprinkler head 12 and the handgrip 20 is turned back and forth, the tubular cutting assembly 22 will remove grass 30 from about the sprinkler head 12 in the lawn 16.

The handle 18 is an elongated shaft 32. The handgrip 20 is a cylindrical bar 34. The tubular cutting assembly 22 consists of a cylindrical hollow body 36. A plurality of curved blades 38 are provided. Components 40 are for affixing the curved blades 38 in an abutting side by side relationship on and about the cylindrical hollow body 36. The curved blades 38 will penetrate the ground 41 about the sprinkler head 12 and remove the grass 30 therefrom.

The cylindrical hollow body 36 is a flat annular ring member 42. Each curved blade 38 includes a V-shaped lower cutting edge 44, to better penetrate the ground 41 to remove the grass 30 from about the sprinkler head 12.

The affixing components 40 comprises a plurality of fasteners 46, to retain the curved blades 38 to an outer circumference 48 of the cylindrical hollow body 36. The connecting structure 24 includes a ferrule 48 mounted onto the bottom end 26 of the handle 18. A pair of bow arms 50 extend from the ferrule 48 and are fastened to the upper end 28 of the tubular cutting assembly 22.

The handle 18 and the handgrip 20 are both fabricated out of a durable strong metal material 52 and are welded together at 54 in a T-shaped configuration. The cylindrical hollow body 36 and the curved blades 38 are fabricate out of the durable strong metal material 52 and the fasteners 46 are rivets 54. The ferrule 48 and the bow arms 50 are fabricated out of the durable strong metal material 52.

Figure 4:
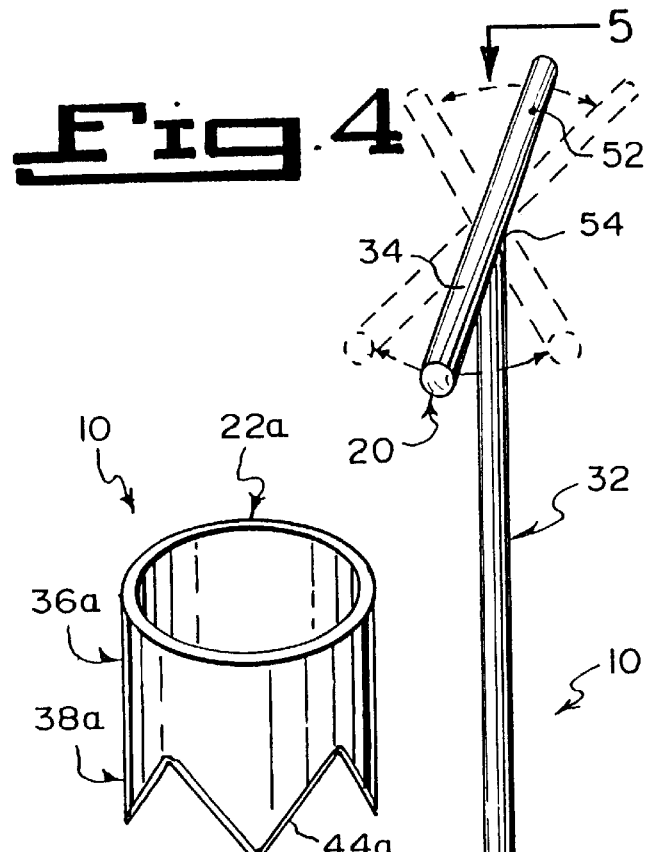
FIG. 4 is a perspective view of the instant invention per se.
Figure 4A:
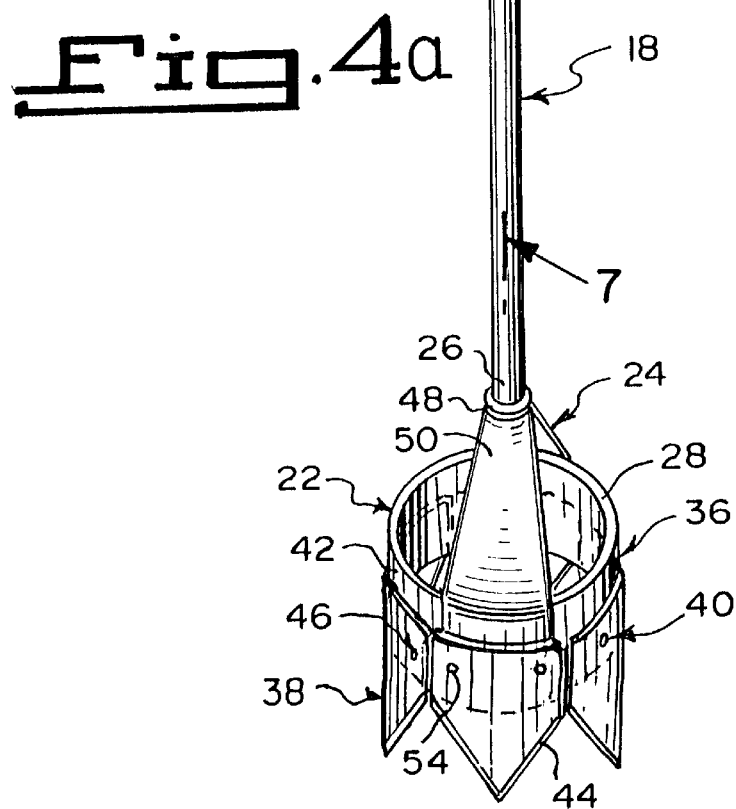
FIG. 4a is a perspective view of a modified tubular cutting assembly, in which the tubular cutting assembly is of a one piece construction.

FIG. 4a shows a modified tubular cutting assembly 22a of the grass trimmer 10 and is of a one piece construction. It consists of a cylindrical hollow body 36a having a plurality of integral curved blades 38a formed thereon, which extends downwardly thereabout. Each curved blade 38a has a V-shaped lower cutting edge 44a to better penetrate the ground 41, to remove the grass 30 from about the sprinkler head 12.

Operation of the Invention

To use the grass trimmer 10, the following steps should be taken:

1. Hold onto opposite ends of the handgrip 20 with both hands and allow the handle 18 to extend downwardly therefrom.

2. Place your feet on both sides of the sprinkler head 12 in the lawn 16.

3. Position the tubular cutting assembly 22 or 22a directly over the sprinkler head 12.

4. Push the hand grip 20 down, so that the V-shaped lower cutting edges 44 or 44a of the curved blades 38 or 38a will penetrate the ground 41 about the sprinkler head 12.

5. Turn the handgrip 20 back and forth, so that the V-shaped lower cutting edges 44 or 44a of the curved blades 38 or 38a will remove the grass 30 from about the sprinkler head 12 in the lawn 16.

6. Lift the handgrip 20 up, so that the V-shaped lower cutting edges 44 or 44a of the curved blades 38 or 38a will now leave the ground 41 about the sprinkler head 12, to allow the tubular cutting assembly 22 or 22a to be positioned over another sprinkler head 12.

List of Reference Numbers 10 grass trimmer
12 sprinkler head
14 water supply pipe on 12
16 lawn
18 handle of 10
20 handgrip of 10

22 tubular cutting assembly of 10
22*a* modified tubular cutting assembly of 10
24 connecting structure of 10
26 bottom end of 18
28 upper end of 22
30 grass in 16
32 elongated shaft for 18
34 cylindrical bar for 20
36 cylindrical hollow body of 22
36*a* cylindrical hollow body of 22*a*
38 curved blade of 22
38*a* curved blade integral with 36*a*
40 affixing component of 22
41 ground
42 flat annular ring member for 36
44 V-shaped lower cutting edge on 38
44*a* V-shaped lower cutting edge on 38*a*
46 fastener of 40
48 ferrule of 24
50 bow arm of 24
52 durable strong metal material for 18, 20, 36, 38, 48 and 50
54 rivet for 46.

It will be understood that each of the elements described above, or two or more together may also find a useful application in other types of methods differing from the type described above.

While certain novel features of this invention have been shown and described are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A grass trimmer for a sprinkler head on a water supply pipe in a lawn comprising:
   a) a handle;
   b) a handgrip transversely attached to a top end of said handle;
   c) a tubular cutting assembly, including:
      i) a cylindrical hollow body;
      ii) a plurality of curved blades; and
      iii) means for affixing said curved blades in an abutting side by side relationship on and about said cylindrical hollow body, so that said curved blades will penetrate the ground about the sprinkler head and remove the grass therefrom; and
   d) means for connecting a bottom end of said handle to an upper end of said tubular cutting assembly, said connecting means including a ferrule mounted onto the bottom end of said handle and a pair of bow arms extending from said ferrule and fastened to the upper end of said tubular cutting assembly so that when said tubular cutting assembly is placed over the sprinkler head and the handgrip is turned back and forth, said tubular cutting assembly will remove grass from about the sprinkler head in the lawn.

2. A grass trimmer for a sprinkler head as recited in claim 1, wherein said handle is an elongated shaft.

3. A grass trimmer for a sprinkler head as recited in claim 1, wherein said handgrip is a cylindrical bar.

4. A grass trimmer for a sprinkler head as recited in claim 1, wherein said cylindrical hollow body is a flat annular ring member.

5. A grass trimmer for a sprinkler head as recited in claim 1, wherein each said curved blade includes a V-shaped lower cutting edge to better penetrate the ground to remove the grass from about the sprinkler head.

6. A grass trimmer for a sprinkler head as recited in claim 1, wherein said affixing means includes a plurality of fasteners to retain said curved blades to an outer circumference of said cylindrical hollow body.

7. A grass trimmer for a sprinkler head as recited in claim 1, wherein said handle and said handgrip are both fabricated out of a durable strong metal material and are welded together in a T-shaped configuration.

8. A grass trimmer for a sprinkler head as recited in claim 6, wherein said cylindrical hollow body and said curved blades are fabricated out of a durable strong metal material and said fasteners are rivets.

9. A grass trimmer for a sprinkler head as recited in claim 1, wherein said ferrule and said bow arms are fabricated out of a durable strong metal material 52.

10. A grass trimmer for a sprinkler head as recited in claim 1, wherein said tubular cutting assembly is of a one piece construction and includes a cylindrical hollow body having a plurality of integral curved blades formed thereon and extending downwardly thereabout, with each said curved blade having a V-shaped lower cutting edge to better penetrate the ground to remove the grass from about the sprinkler head.

11. A grass trimmer for a sprinkler head as recited in claim 2, wherein said tubular cutting assembly includes:
   a) a cylindrical hollow body;
   b) a plurality of curved blades; and
   c) means for affixing said curved blades in an abutting side by side relationship on and about said cylindrical hollow body, so that said curved blades will penetrate the ground about the sprinkler head and remove the grass therefrom.

12. A grass trimmer for a sprinkler head as recited in claim 11, wherein said cylindrical hollow body is a flat annular ring member.

13. A grass trimmer for a sprinkler head as recited in claim 12, wherein each said curved blade includes a V-shaped lower cutting edge to better penetrate the ground to remove the grass from about the sprinkler head.

14. A grass trimmer for a sprinkler head as recited in claim 13, wherein said affixing means includes a plurality of fasteners to retain said curved blades to an outer circumference of said cylindrical hollow body.

15. A grass trimmer for a sprinkler head as recited in claim 14, wherein said handle and said handgrip are both fabricated out of a durable strong metal material and are welded together in a T-shaped configuration.

16. A grass trimmer for a sprinkler head as recited in claim 15, wherein said cylindrical hollow body and said curved blades are fabricated out of a durable strong metal material and said fasteners are rivets.

17. A grass trimmer for a sprinkler head as recited in claim 16, wherein said ferrule and said bow arms are fabricated out of a durable strong metal material 52.

18. A grass trimmer for a sprinkler head as recited in claim 17, wherein said tubular cutting assembly is of a one piece construction and includes a cylindrical hollow body having a plurality of integral curved blades formed thereon and extending downwardly thereabout, with each said curved blade having a V-shaped lower cutting edge to better penetrate the ground to remove the grass from about the sprinkler head.

* * * * *